United States Patent [19]

Schmid et al.

[11] Patent Number: 4,942,049
[45] Date of Patent: Jul. 17, 1990

[54] PROCESS FOR CONTROLLING FOAM IN FOOD PROCESSING AND PRODUCTION

[75] Inventors: Karl H. Schmid, Mettmann; Alfred Meffert, Monheim; Gilbert Schenker, Erkrath; Adolf Asbeck, Duesseldorf, all of Fed. Rep. of Germany

[73] Assignee: Henkel Kommanditgesellschaft auf Aktien, Duesseldorf-Holthausen, Fed. Rep. of Germany

[21] Appl. No.: 295,878

[22] Filed: Jan. 11, 1989

[30] Foreign Application Priority Data

Jan. 11, 1988 [DE] Fed. Rep. of Germany ....... 3800492

[51] Int. Cl.$^5$ .............................................. A23L 1/42
[52] U.S. Cl. ............................... 426/329; 252/174.21; 252/358; 435/266; 435/812
[58] Field of Search ................ 426/329, 470; 435/266, 435/812; 252/174.21, 174.22, 321, 358

[56] References Cited

U.S. PATENT DOCUMENTS 2,792,308  5/1957  Morse ................................... 426/329
4,548,729 10/1985  Schmid et al. ................. 252/174.21
4,622,303 11/1986  Schmid et al. ...................... 435/243
4,753,885  6/1988  Dietsche et al. .................... 435/243
4,792,582 12/1988  Hoefer et al. ....................... 524/378

OTHER PUBLICATIONS

Morreson 1969 Organic Chemistry, 2nd ed., Allynand Bacon Inc., Boston, pp. 103–105.

*Primary Examiner*—Carolyn Paden
*Attorney, Agent, or Firm*—Ernest G. Szoke; Wayne C. Jaeschke; John E. Drach

[57] ABSTRACT

Terminally blocked polyethoxylated fatty alcohols of the formula:

$$R\text{—}O\text{—}(CH_2CH_2O)_n\text{—}R^1 \qquad (I)$$

wherein R is a linear or branched alkyl or alkenyl group having from 6 to 28 carbon atoms, $R_1$ is a linear alkyl group having from 1 to 8 carbon atoms, and n is an integer having a value of from 2 to 12 are used as antifoaming additives in the manufacture and/or processing of food stuffs as well as in fermentation processes.

3 Claims, No Drawings

PROCESS FOR CONTROLLING FOAM IN FOOD PROCESSING AND PRODUCTION

BACKGROUND OF THE INVENTION

1. Field of the Invention

This invention relates to a method of controlling foam in the processing and/or production of foodstuffs and in fermentation processes such as in the production of pharmaceuticals. More specifically, this invention relates to a method of controlling foam in the processing and/or production of foodstuffs and in fermentation processes such as in the production of pharmaceuticals through the use of terminally blocked polyethoxylated fatty alcohols.

2. Description of the Related Art

Foam control is of considerable importance in the sugar and yeast industry, in the potato processing industry, and in industrial fermentation processes such as those carried out on a commercial scale as in the production of antibiotics. In the commercial processing of, for example, sugar-containing saps such as occurs in the processing of sugar beets and sugar cane and in the manufacture of baker's yeast using molasses, or in the production of finished potato products such as french fries or potato chips, the formation of foam must be reduced to an amount that is harmless to the production process by the addition of anti-foam additives. A variety of surface active compounds are present in the saps involved in the production and processing of foodstuffs or in fermentation processes. These include naturally occurring substances such as humic acids, proteins, degradation products of proteins and starch, pectins, and saponins. These surface active materials contribute to the generation of unwanted foam which can occupy a considerable portion of the working volume of process vessels and therefore, effectively reduce the size of these vessels and ultimately lower the overall output of a particular production plant. In addition, a considerable amount of finished product can be lost if it is necessary to physically remove the foam in order to continue operating the process. Foam problems can be particularly acute in sugar refineries due to excessive foam generation in the diffusers, in the clarifiers, in the carbonizing tanks, and in the evaporators. In the fermentation vats involved in the manufacture of yeast a certain amount of foam has to be taken into account due to the ventilation of the fermentation broth, its extent however, must be confined to a certain limit. However, foaming is still a problem in fermentation processes. The foam controlling agents that are usually added to reduce the amount of foam generated in the production and processing of foodstuffs or in fermentation processes must be removed to a large extent from the solutions to which they have been added in order that the finished products are not impaired by the residual amounts of foam controlling agents.

One of the principal disadvantages of the prior art processes for controlling the generation of unwanted foams formed during the production and/or processing of foodstuffs or in fermentation processes lies in the fact that the anti-foaming agents have to be used in large quantities. Therefore, since they cannot be removed from process streams to the desired extent, the finished products are contaminated with the anti-foaming agents thereby causing potential odor and taste problems. In addition, since the anti-foaming agents also persist in the process streams and since these streams are normally disposed of directly to sewers, the anti-foaming agents should be biodegradable by the normal sewage treatment microorganisms. Also, anti-foaming agents used in fermentation processes such as in the manufacture of yeast must not impair the growth of the yeast cells and therefore, affect the yield of yeast from the fermentation process.

It is also important that anti-foaming agents used in food processing and fermentation operations maintain their effectiveness for long time periods. Some anti-foaming agents are effective only for short time periods after they are added requiring that repeated and costly additions be made in order to maintain an anti-foaming effect.

Prior art processes for controlling foam in food processing and fermentation operations include adding to the processing liquids a foam-controlling amount of for example, rape oil, peanut oil, olive oil, wool fat, fatty acid monoglycerides, fatty acid polyglycol esters, polyalkylene glycols, tall oil esters, ethylene oxide adducts of alkyl phosphoric acids, ethylene oxide adducts of branched fatty alcohols, alkylene oxide adducts of oligosaccharides, and free fatty alcohols. These types of compounds have not been effective foam-controlling agents because they must be used in relatively large amounts, or are not sufficiently biodegradable to meet current biodegradability standards. Rapid biological degradation without the formation of metabolites in the clarifying plant of a sugar refinery for example, is one of the most important requirements for foam-controlling agents today.

Some of the compounds employed as anti-foaming agents in the process of the present invention have been disclosed as components in foam-inhibiting compositions for cleaning meta glass, ceramic, or plastic in U.S. Pat. No. 4,548,729 (equivalent to European Patent Application No. EP-A-124815). The patent discloses a foam-inhibiting composition consisting of a terminally blocked polyethoxylated fatty alcohol of the general formula $R-O-(CH_2CH_2O)_n-R^1$, wherein R is an alkyl or alkenyl group having from 8 to 18 carbon atoms, $R_1$ is an alkyl group having from 4 to 8 carbon atoms and, n is an integer from 7 to 12. These compounds were not previously known for use in compositions which relate to foam suppression in food production or processing or in fermentation processes. There is no suggestion in U.S. Pat. No. 4,548,729 that a terminally blocked polyethoxylated fatty alcohol would be odorless, tasteless, and harmless to humans and would not impair the growth of microorganisms.

It is therefore, an object of the present invention to overcome the disadvantages of the prior art by providing a process for controlling foam in a food production or processing operation or fermentation operation which employs anti-foaming additives effective at low concentrations for extended periods of time which are also odorless and tasteless and harmless to humans. It is also an object of the present invention to provide a process for controlling foam in a fermentation operation which employs anti-foaming additives which do not impair the growth of microorganisms produced in the fermentation operation. It is a further object of the present invention to provide a process for controlling foam in a food production or processing operation or fermentation operation which employs anti-foaming additives which are biodegrade without the formation of metabolites.

DESCRIPTION OF THE INVENTION

Except for the operating examples, all numbers expressing quantities of ingredients or reaction conditions are understood to be modified by "about". One embodiment of the present invention relates to a process for controlling foam in an aqueous food processing or fermentation liquid comprising adding to said aqueous liquid a foam inhibiting-effective amount of a compound of the formula $$R-O-(CH_2CH_2O)_n-R^1 \qquad (I)$$

wherein R is a linear or branched, alkyl, or alkenyl group having from 6 to 28 carbon atoms, $R_1$ is a linear alkyl group having from 1 to 8 carbon atoms, and n is an integer having a value of from 2 to 12. Another embodiment of the present invention relates to a composition comprising an aqueous food processing or fermentation liquid having therein a foam inhibiting-effective amount of a compound of formula I.

The process of the present invention is carried out by adding a foam inhibiting-effective amount of an terminally blocked polyethoxylated fatty alcohol to an aqueous food processing or fermentation liquid to control the generation of foam during the processing operations. For the purposes of this invention an aqueous food processing or fermentation liquid is defined as any aqueous solution, suspension, dispersion, or combination thereof that is a part of a process for the production and/or processing of foodstuffs or any aqueous solution, suspension, dispersion or combination thereof that is a part of a fermentation process. Examples of such aqueous liquids include sugar-containing saps such as those found in the clarifiers, evaporators, and/or the carbonizers of a sugar refinery; processing liquids from potato peeling and cutting operations; molasses solutions or syrups used in the manufacture of yeast; and fermentation broths involved in the production of antibiotics.

The compounds which can be used in the process of the present invention are terminally blocked polyethoxylated fatty alcohols of formula I which can be produced from polyethoxylated fatty alcohols and $C_1$ to $C_8$ linear alkyl halides under the known conditions of a Williamson ether synthesis. Examples of suitable polyethoxylated saturated alcohols include the ethylene oxide adducts of the following saturated alcohols and their structural and positional isomers: 1- hexanol, 2-hexanol, 3-hexanol, 3-methyl-2-hexanol, 1-octanol, 2-octanol, 3-methyl-2-heptanol 1-decanol, 1-dodecanol, 2-ethyl-1-dodecanol, 2-ethyl-1-hexanol, 1-hexadecanol, 1-octadecanol, 2-hexyl-1-dodecanol, 2-octyl-1-dodecanol, 1-icosanol, 1-docosanol, 1-tetracosanol, 1-octacosanol and the like. Examples of suitable polyethoxylated unsaturated alcohols include the ethylene oxide adducts of the following unsaturated alcohols and all the structural, double-bond positional-and functional group-positional isomers of the following alcohols: hexenol, octenol, decenol, dodecenol, hexadecenol, octadecenol, icosenol, docosenol, tetracosenol, and octacosenol. Specific examples of such unsaturated alcohols include 1-hexenol, 1-hexen-2-ol, cis-2-hexen-1-ol, trans-2-hexen-1-ol, cis-7-dodecen-1-ol, 9-octadecen-1-ol (oleyl alcohol), 9,12-octadecadien-1-ol (linoleyl alcohol), 9,12,15-octadecatrien-1-ol (linolenyl alcohol), and 5,8,11,14-icosatetraen-1-ol (arachidonyl alcohol) and the like. The above ethylene oxide adducts can be produced by reacting the corresponding alcohol with from 2 to 12 moles of ethylene oxide. Many of polyethoxylated fatty alcohols are known in the art and are available commercially as nonionic surfactants of the ethoxylated alcohol type. Examples of linear alkyl halides which can be reacted with the above mentioned polyethoxylated fatty alcohols under the known conditions of a Williamson ether synthesis to produce compounds of formula I include methyl chloride, ethyl chloride, 1-bromopentane, 1-bromoheptane, and 1-bromooctane and similar alkyl halides having from 1 to 8 carbon atoms.

There are two particularly preferred groups of compounds of formula I useful in the process of the present invention. The first group comprises compounds wherein R is a radical having from 16 to 24 carbon atoms, n is an integer having a value of from 6 to 12, and $R_1$ is an n-butyl group. Particularly preferred are those compounds wherein R is a radical having from 18 to 24 carbon atoms, n is an integer having a value of from 8 to 10 and $R_1$ is an n-butyl group. Examples of such preferred compounds are those formed by polyethoxylation of Guerbet alcohols (alcohols branched at the 2-carbon atom and made by dimerizing fatty alcohols in the Guerbet reaction) followed by reaction with n-butyl chloride or n-butyl bromide under the known conditions of a Williamson ether synthesis.

The second group comprises compounds wherein R is a radical having from 6 to 14 carbon atoms, n is an integer having a value of from 2 to 6, and $R_1$ is a methyl group. Particularly preferred are those compounds wherein R is a radical having from 8 to 13 carbon atoms, n is an integer having a value of from 2 to 4 and $R_1$ is a methyl group. Examples of such preferred compounds are those formed by ethoxylation or polyethoxylation of natural or synthetic shorter chain alcohols particularly those with an odd number of carbon atoms such as those made by the oxo process followed by reaction with methyl chloride or methyl bromide under the known conditions of a Williamson ether synthesis.

Examples of the preferred terminally blocked polyethoxylated fatty alcohols for use in the process of the present invention include:

2-octyldodecyl-$(EO)_8$-n-butyl ether
2-octyldodecyl-$(EO)_{10}$-n-butyl ether
2-hexyldodecyl-$(EO)_6$-n-butyl ether
2-hexyldodecyl-$(EO)_8$-n-butyl ether
($C_{12}$-$C_{18}$) coconut alkyl-$(EO)_{10}$-n-butyl ether
octyl-$(EO)_2$-methyl ether
dodecyl-$(EO)_2$-methyl ether
($C_{12}$-$C_{18}$) coconut alkyl-$(EO)_4$-methyl ether
ethylhexyl-$(EO)_2$-methyl ether
isononyl-$(EO)_2$-methyl ether
isotridecyl-$(EO)_4$-methyl ether The preferred amount of terminally blocked polyethoxylated fatty alcohol added to the aqueous food processing or fermentation liquid in the process of the present invention is from about 50 ppm to about 500 ppm by volume. The most preferred amount of terminally blocked polyethoxylated fatty alcohol added to the aqueous food processing or fermentation liquid is about 500 ppm by volume. The following examples serve to illustrate but not to limit the invention.

Examples 1 through 14.

The following procedure was used to compare the efficacy of the anti-foaming additives of examples 1 through 14.

To a 2.0 liter graduated cylinder immersed in a 25° C. constant temperature bath was added about 500 ml of a solution comprising about 22% by volume of sugar syrup, potato processing liquid, or fermentation liquor and 78% by volume water having a DIN hardness of 17°. A glass tube connected at one end to the suction side of a laboratory pump having an output of 3 liters/minute was inserted into the graduated cylinder containing the solution to be tested so that the other end of the tube touched the bottom of the graduated cylinder. The output side of the pump was connected to another glass tube positioned at the top edge of the graduated cylinder so that it was about 25 to 30 cm above the liquid level. The pump was started and the liquid was recirculated from the graduated cylinder and back through the tube at the top edge of the graduated cylinder. The liquid fell from a height of about 25–30 cm back into the graduated cylinder generating a foam over a period of time. The pumping was continued in this manner until a volume of foam plus liquid totaling about 2000 ml (the blank value in Table 1) was achieved. After this constant volume was reached, about 0.1 ml of anti-foam additive was added from a micropipette to the recirculating liquid in the graduated cylinder and the foam height was recorded at the time intervals given in Table 1.

The materials tested as anti-foaming agents according to the above procedure were:

| Example | Anti-foaming Agent |
|---|---|
| 1. | 2-octyldodecyl-(EO)$_8$-n-butyl ether |
| 2. | 2-octyldodecyl-(EO)$_{10}$-n-butyl ether |
| 3. | 2-hexyldodecyl-(EO)$_6$-n-butyl ether |
| 4. | 2-hexyldodecyl-(EO)$_8$-n-butyl ether |
| 5. | octyl-(EO)$_2$-methyl ether |
| 6. | decyl-(EO)$_2$-methyl ether |
| 7. | decyl-(EO)$_4$-methyl ether |
| 8. | By-product of oxoalcohol or oleyl alcohol synthesis + 15% by weight ethylene oxide |
| 9. | By-product of oxoalcohol or oleyl alcohol synthesis + 7% by weight ethylene oxide + 27% by weight propylene oxide |
| 10. | Oleic acid- 1 mole propylene oxide |
| 11. | Oleic acid- 3 moles propylene oxide |
| 12. | By-product of oxoalcohol or oleyl alcohol synthesis + 16% by weight ethylene oxide + 41% by weight propylene oxide |
| 13. | By-product of oleyl alcohol synthesis + 15% by weight ethylene oxide + 40% by weight propylene oxide |
| 14. | Polyglycerol + 7 moles ethylene oxide + 22 moles propylene oxide esterified with oleic acid. |

Anti-foaming agents according to the process of the present invention were used in examples 1–7 while compounds used previously as anti-foaming agents were used in examples 8–14. These compounds are also referred to in Table I.

TABLE I

Foam measurements (ml) for the various de-foaming agents

| Substance[a] | Blank value | ml of foam after time (minutes) following the addition of the defoaming agent | | | | | | | |
|---|---|---|---|---|---|---|---|---|---|
| | | 0.5 | 1 | 2 | 3 | 5 | 10 | 20 | 30 |
| 1 | 2000 | 480 | 480 | 480 | 480 | 480 | 480 | 480 | 500 |
| 2 | 2000 | 460 | 460 | 460 | 460 | 460 | 480 | 480 | 500 |
| 3 | 2000 | 460 | 460 | 460 | 460 | 460 | 460 | 460 | 460 |
| 4 | 2000 | 460 | 460 | 480 | 480 | 480 | 480 | 480 | 500 |
| 5 | 2000 | 460 | 460 | 460 | 460 | 460 | 560 | 580 | 640 |
| 6 | 2000 | 440 | 460 | 460 | 460 | 460 | 460 | 460 | 500 |
| 7 | 2000 | 500 | 500 | 500 | 500 | 520 | 520 | 540 | 540 |
| 8 | 2000 | 1240 | 1000 | 740 | 660 | 620 | 620 | 640 | 640 |
| 9 | 2000 | 640 | 580 | 560 | 560 | 560 | 560 | 580 | 580 |
| 10 | 2000 | 1540 | 1120 | 820 | 660 | 620 | 580 | 580 | 600 |
| 11 | 2000 | 1280 | 840 | 680 | 600 | 580 | 580 | 580 | 600 |
| 12 | 2000 | 560 | 560 | 540 | 540 | 540 | 540 | 540 | 540 |
| 13 | 2000 | 680 | 560 | 560 | 560 | 560 | 560 | 580 | 600 |
| 14 | 2000 | 900 | 520 | 520 | 520 | 500 | 500 | 500 | 540 |

[a]substances 1–7 are compounds according to the present invention. Substances 8–14 are compounds used for comparison.

What is claimed is:

1. A process for controlling foam in an aqueous food processing or fermentation liquid comprising adding to said aqueous liquid a foam-inhibiting effective amount of a compound of formula I $$R-O-(CH_2CH_2O)_n-R^1 \qquad (I)$$

wherein R is a $C_{20-24}$ alkyl group, $R^1$ is a $C_{1-4}$ alkyl group and n is an integer equal to from 2 to about 10.

2. The process of claim 1 wherein in the compound of formula I R is 2-octyldodecyl, $R^1$ is n-butyl and n is 8.

3. The process of claim 1 wherein in the compound of formula I R is 2-hexyldodecyl, $R^1$ is n-butyl and n is 8.